United States Patent [19]

Osti et al.

[11] Patent Number: 5,613,344
[45] Date of Patent: Mar. 25, 1997

[54] DEVICE FOR THE FORMATION OF TUBULAR OVERWRAPPINGS IN HEAT-SEALABLE MATERIAL

[75] Inventors: Roberto Osti, Zola Predosa; Antonio Gamberini, Bologna, both of Italy

[73] Assignee: G.D. S.p.A., Bologna, Italy

[21] Appl. No.: 471,090

[22] Filed: Jun. 6, 1995

Related U.S. Application Data

[62] Division of Ser. No. 155,164, Nov. 19, 1993, Pat. No. 5,533,323.

[30] Foreign Application Priority Data

Nov. 20, 1992 [IT] Italy .................... BO92A0414

[51] Int. Cl.⁶ ............... B65B 11/30; B65B 19/22; B65B 49/00
[52] U.S. Cl. .................. 53/234; 53/228; 53/375.9
[58] Field of Search ............. 53/234, 232, 233, 53/228, 466, 375.9, 372.2, 371.9

[56] References Cited

U.S. PATENT DOCUMENTS

| | | | |
|---|---|---|---|
| 2,243,633 | 5/1941 | Jones | 53/233 |
| 2,400,682 | 5/1946 | Bronander | 53/234 |
| 2,592,283 | 4/1952 | Hohl et al. | 53/233 |
| 2,652,670 | 9/1953 | Carrier | 53/233 |
| 2,723,516 | 11/1955 | Malhiot | 53/233 |
| 3,136,104 | 6/1964 | Geer et al. | 53/233 |
| 3,438,176 | 4/1969 | Reil et al. | 53/372.2 |
| 4,408,439 | 10/1983 | Anderson | 53/234 |
| 4,574,562 | 3/1986 | Cavazza | 53/228 X |
| 4,617,780 | 10/1986 | Focke et al. | 53/228 X |
| 4,738,073 | 4/1988 | Mattei et al. | 53/234 |
| 4,845,924 | 7/1989 | Focke et al. | 53/234 |
| 4,887,408 | 12/1989 | Mattei et al. | 53/466 |
| 5,003,755 | 4/1991 | Draghetti | 53/234 X |
| 5,154,035 | 10/1992 | Cavazza | 53/234 X |
| 5,269,117 | 12/1993 | Boriani et al. | 53/375.9 |

FOREIGN PATENT DOCUMENTS

| | | |
|---|---|---|
| 0368034 | 5/1990 | European Pat. Off. . |
| 0553625 | 8/1993 | European Pat. Off. . |

*Primary Examiner*—James F. Coan
*Attorney, Agent, or Firm*—Cushman Darby & Cushman IP Group Of Pillsbury Madison & Sutro LLP

[57] ABSTRACT

A method of fashioning tubular overwrappings with a heat-sealable material, and a device in which single commodities are directed in succession together with respective sheets of heat-sealable material into a set of pockets spaced apart at a constant pitch around the periphery of an indexing wheel rotated through steps of length equal to a submultiple of the pitch of the peripheral pockets. The pockets currently occupied pause after each step in alignment with a relative set of heat-seal stations and are accompanied through the first step, approaching the first heat-seal station, by a moving folder positioned so as to flatten a first longitudinal flap of the relative sheet against the flank of the commodity; a second flap is flattened similarly over the first flap by a fixed folder whereupon the two flaps are held fast in overlap contact, ready for heat-sealing.

16 Claims, 4 Drawing Sheets

DEVICE FOR THE FORMATION OF TUBULAR OVERWRAPPINGS IN HEAT-SEALABLE MATERIAL

This is a divisional of application Ser. No. 08/155.164, filed Nov. 19, 1993 now U.S. Pat. No. 5,533,323.

BACKGROUND OF THE INVENTION

The present invention relates to apparatus for providing tubular overwrappings from a heat-sealable material.

The invention finds advantageous application in the field of machines for overwrapping packets of cigarettes in transparent heat-sealable material, and whilst reference is made specifically herein to such machines, no limitation of scope is implied. Conventionally, the overwrapping devices used in such machines are of a type essentially comprising a wheel affording a plurality of peripheral pockets and an infeed station through which the pockets are indexed in succession by the wheel, each pocket pausing to receive a single packet of cigarettes together with a sheet of the overwrapping material. The sheet is folded into a "U" formation around the packet as the packet is directed toward the wheel. The packet is received by the pocket with the two longitudinal edges of the "U" profile projecting as flaps which are folded into overlapping contact and heat-sealed one to the other, thereby fashioning a tubular wrapping around the respective packet.

In the conventional overwrapping devices referred to above, still found in widespread use, the flap of material projecting from the rear edge of the peripheral pocket, in relation to the direction of rotation of the wheel, is flattened against the respective packet generally by means of a moving folder. The moving folder is located adjacent to the infeed station and typically includes a plate of curved profile which, once the packet and the enveloping sheet of material have been transferred to the corresponding pocket of the wheel, is made to traverse along the periphery, concurrently with the rotation of the wheel, moving from an at-rest position to a folding position over the pocket. As the wheel is indexed thereafter through a further step, during which the moving folder may also be returned to the at-rest position, the folded rear flap emerges from beneath the contoured plate, and the remaining forwardmost flap enters into contact with a fixed folder by which it is flattened over a corresponding portion of the rear flap.

Conventional overwrapping devices of the type thus briefly outlined have certain drawbacks, stemming mainly from the indexing movement of the wheel and, if applicable, from the return of the moving folder to the at-rest position, during which the rear flap of the overwrapping sheet tends to shift backwards, i.e. in the direction opposite to that (forward) of the fold. Such dragging of the rear flap both against the moving folder and against a portion of the fixed causes the initial crease in the rear flap to be lost.

The object of the present invention is to set forth apparatus for fashioning tubular overwrappings that will overcome the drawback described above.

SUMMARY OF THE INVENTION

The stated object is realized, according to the present invention, in apparatus for a method for the formation, around commodities, of tubular overwrappings of a heat-sealable material.

Such apparatus is useful in a method includes the steps of: feeding commodities in succession together with respective sheets of overwrapping material onto a conveying path extending between an infeed station and an outfeed station; folding each sheet into a "U" formation around the relative commodity, in such a way that a first and a second longitudinal flap of the sheet remain projecting laterally from the commodity; indexing the commodities along the conveying path through steps of constantly repeated length and in a given feed direction, in such a way that the commodities remain distributed at regular intervals along the path and that the first projecting longitudinal flap follows the second in the feed direction; flattening each first flap against the face of the relative commodity when at a determined folding position; and flattening each second flap over the relative first flap during a step indexed beyond the folding position in the feed direction. The method also comprises the additional steps of subjecting each first flap to a static pressure directed toward the respective commodity, applied during the step indexed beyond the folding position; subjecting each second flap to a static pressure directed toward the commodity and the first flap, applied after the step indexed beyond the folding position; and securing each second flap to the respective first flap, by means of a first heat seal operation, in such a way as to create a relative tubular overwrapping. In a preferred version of the method disclosed, the folding position coincides with the infeed station, and the step indexed beyond the folding position is the first step indexed beyond the infeed station. In the method thus described, the indexing step occurs during the interval at which commodities are distributed along the conveying path; moreover, the length of the conveying path is equal preferably to a multiple of the indexing step and, at least, integrally divisible by the interval at which the commodities are distributed along the path. Each step completed by the single commodity is followed by a pause, the tubular overwrapping undergoes a selectable number of further heat-seal operations during its progress along the conveying path, and the execution of each further heat-seal operation coincides with a respective pause. The stated object is realized similarly in a device for the formation, around commodities, of tubular overwrappings of a heat-sealable material. According to the invention such a device comprises: a wheel affording a plurality of peripheral pockets spaced apart circumferentially at a constant pitch, mounted rotatably about its own axis in such a way as to index the pockets through steps of constantly repeated length and in a given feed direction along a conveying path affording an infeed station and an outfeed station; feed means by which commodities are supplied singly and in succession each together with a respective overwrapping sheet to the infeed station; pushing means by which a single commodity is directed together with the respective sheet of overwrapping material into a corresponding pocket, constraining the sheet to fold around the commodity into a "U" formation of which a first and a second longitudinal flap remain projecting laterally from the commodity and externally of the pocket, the first flap following the second flap in the feed direction; first folding means capable of movement relative to the wheel between an at-rest position and a folding position, by which the first flap of each successive sheet is flattened against the respective commodity; and second folding means occupying a position immediately beyond the folding position along the conveying path, by which the second flap of each succesive sheet is flattened over the corresponding first flap.

The device disclosed additionally comprises a first heat-seal station positioned along the conveying path at a distance from the folding position equal to one indexing step of the wheel; pressing means positioned at the first heat-seal station, capable of movement toward the wheel in such a way as to restrain the second flap over the first in a given position; and first heat-sealing means associated with the first heat-seal station, by which the restrained second flap is secured to the first flap in such a way as to form a tubular overwrapping. The first folding means of the device is advantageously capable of movement together with the wheel between the folding position and the first heat-seal station.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
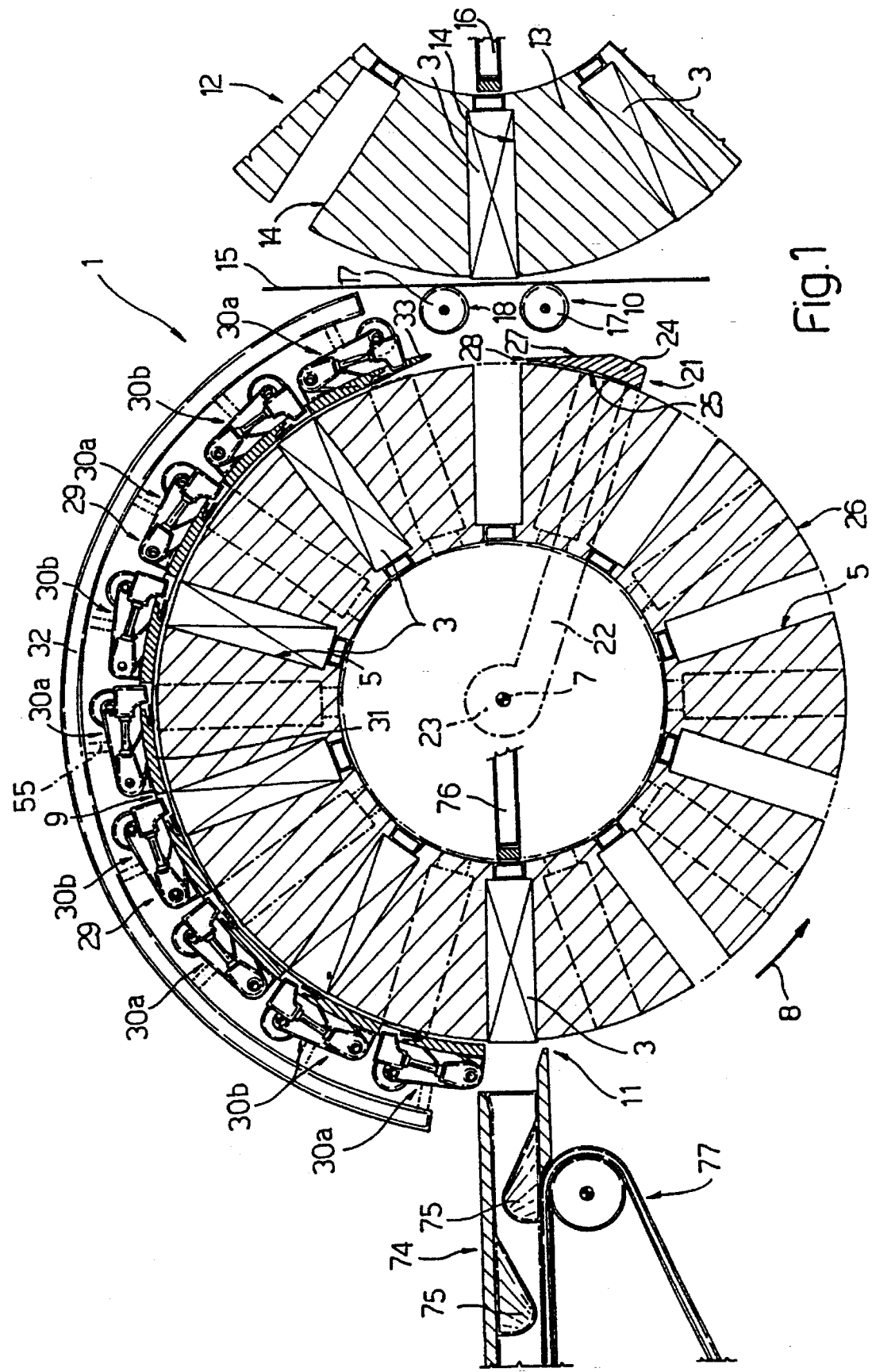
FIG. 1 is a schematic illustration of a preferred embodiment of the overwrapping device according to the invention, viewed in section with certain parts omitted better to reveal others.

With reference to FIG. 1 of the drawings, numeral 1 denotes a device, in its entirety, by means of which to fashion a tubular overwrapping 2 of a heat-sealable material around a packet of cigarettes 3. As discernible from FIG. 1, and from the detail of FIG. 2, the device 1 comprises a wrapping wheel 4 affording a plurality of peripheral pockets 5 (ten, in the particular example illustrated) distributed circumferentially around the wheel 4 at a constant pitch. The wheel 4 is keyed onto a power driven center shaft 6, of which the axis 7 is disposed at right angles to the viewing plane of FIGS. 1 and 2, the wheel 4 is rotatable intermittently in a counterclockwise feed direction (as viewed in FIGS. 1 and 2), indicated by the arrow denoted 8, so as to index the pockets 5 in this same direction 8 through a step equal to half the circumferential pitch, along a conveying path 9 of semicircular geometry extending between an infeed station 10 and an outfeed station 11. Accordingly, terms used in the specification such as "forward", "beyond", "rear", "following" etc., are referred to the feed direction 8. Still referring to FIG. 1, the overwrapping device 1 further comprises a feed unit 12 incorporating a second wheel 13, in this instance mounted in such a way as to be rotatable in a clockwise direction as viewed in FIG. 1 about an axis (not illustrated) disposed parallel to the axis 7 of the overwrapping wheel 4. The second wheel has a plurality of peripheral pockets 14 each designed to accommodate one respective packet 3, which are indexed in succession by the wheel 13 through the infeed station 10 at a frequency equivalent to half the indexing frequency of the overwrapping wheel 4. The feed unit 12 also incorporates a conventional device (not illustrated) by which single sheets 15 of a selected heat-sealable overwrapping material are directed serially toward the infeed station 10 and positioned between the opposed peripheral faces of the overwrapping wheel 4 and the feed wheel 13. The sheets 15 are supplied to the infeed station 10 at a frequency identical to the indexing frequency of the feed wheel 13, and synchronously with the angular movements of both the wheels 4 and 13, in such a way that a sheet 15 drawing to a standstill at the infeed station 10 will be flanked on either side by two respective pockets 5 and 14 drawing to a standstill in alignment with one another and with the station 10.

Also associated with the infeed station 10 are a pushing device 16 by which each successive packet 3 is transferred from the adjacent pocket 14 of the feed wheel 13 to the pocket 5 of the overwrapping wheel 4 currently aligned with the station 10, and a pair of counter-rotating rollers 17 positioned in conventional manner between the wheels 4 and 13 and establishing a passage 18 through which a packet 3 transferred by the pushing device 16 must advance. Thus, each successive sheet 15 interposed between the feed wheel 13 and the rollers 17 is engaged by a respective packet 3 ejected from the pocket 14 currently alongside, and folded into a "U" formation around the packet before entering the corresponding pocket 5 of the overwrapping wheel 4. The packet and sheet are held in the correct relative position by virtue of the fact that any relative motion between the sheet 15 and the faces of the packet 3 is prevented in conventional manner by the presence of the rollers 17.

Figure 2:
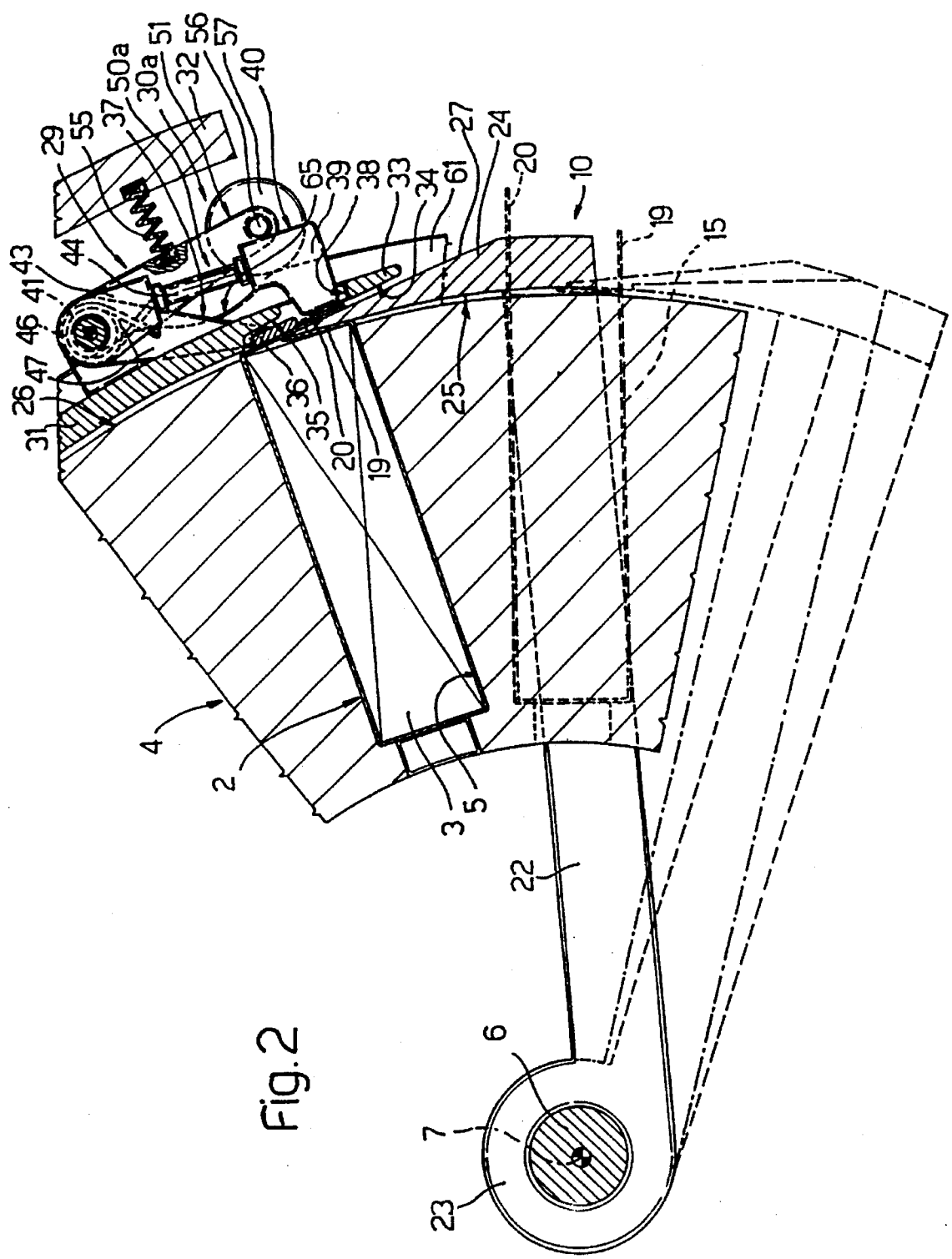
FIG. 2 shows a detailed view of a portion of the device shown in FIG. 1, in enlarged scale.

The cross-sectional dimensions of a single pocket 5 of the overwrapping wheel 4 are marginally greater than the corresponding transverse dimensions of the single packet 3, as indicated in FIG. 2. A sheet 15 folded into the "U" formation and directed into the pocket together with a relative packet 3, through the agency of the pushing device 16, will be accommodated flush against the inside faces of the pocket 5 with two lateral portions of the sheet projecting externally as longitudinal flaps denoted 19 and 20. Again with reference to FIGS. 1 and 2, the device 1 comprises a moving folder 21 composed of an arm 22 extending radially from a hub 23 mounted rotatably to the center shaft 6, and a plate 24 associated rigidly with a free end of the arm 22 and affording a first arched surface 25, directed back toward the hub, which is disposed substantially tangential to and breasted with a cylindrical outer surface 26 of the wheel 4. The plate 24 also affords a portion projecting laterally from the arm 22 in the feed direction 8 and have an angle external face 27, thus presenting a tapered cross-sectional profile comparable to a wedge of which the leading lateral edge 28 is disposed parallel to the axis 7 of the wheel 4.

The moving folder 21 is associated with the infeed station 10 and rotatable about the axis 7 of the wheel, through the action of actuator means (not illustrated) synchronized with the center shaft 6. The moving folder moves between an at-rest position illustrated in FIG. 1 (indicated by the dash-dash phantom line of FIG. 2), in which the leading edge 28 is located immediately behind the rear edge of the pocket 5 occupying the infeed station 10, and an operative limit position indicated by the continuous line of FIG. 2, passing also through an intermediate folding position of substantial alignment with the infeed station 10, which is shown by dot-dash phantom lines in FIG. 2. When the moving folder 21 is in the intermediate position, and therefore within the compass of the infeed station 10, the leading edge 28 is displaced forward from the line occupied in the at-rest limit position by a distance less than or equal to the width of the adjacent longitudinal flap 19. With the folder 21 in the operative limit position, on the other hand, the leading edge 28 is displaced forward from the line occupied in the intermediate position by a distance substantially equal to one indexing step of the wheel 4.

With reference to FIG. 1, the overwrapping device 1 comprises a plurality of heat-seal units 29 located at a respective plurality of heat-seal stations 30 distributed along the conveying path 9 between the infeed station 10 and the outfeed station 11 at a distance one from the next equal to one indexing step of the overwrapping wheel 4. In the particular example illustrated, the length of the conveying path 9 is equivalent to ten indexing steps of the wheel 4, and the device 1 comprises nine heat-seal stations 30 of which five are "odd" stations 30*a*, i.e. reachable by each pocket 5 in an odd number of indexing steps from the infeed station 10, and the remaining four are "even" stations 30*b*, reachable by each pocket 5 in an even number of steps from the infeed station 10.

As shown in FIG. 2, the heat-seal units 29 are accommodated between two arched plates 31 and 32 rigidly interconnected and disposed concurrently with the conveying path 9. One plate 32 is farther from the axis 7 of the wheel 4 than the other plate 31. More exactly, the nine units 29 are supported by the innermost plate 31, which is breasted substantially in contact with the peripheral surface 26 of the wheel 4 and terminates at the rear end in a portion of tapered profile, coinciding with the first heat-seal station 30*a*, positioned at a distance of one indexing step from the infeed station 10, and establishing a fixed folder 33 of which the side offered to the wheel 4 consists in an angled face 34 combining with the adjacent surface 26 to create a void in which the moving folder 21 can be accommodated in part when approaching the operative limit position. The side of the innermost plate 31 directed toward the surface 26 of the wheel affords a plurality of recesses 35 positioned one at each of the heat-seal stations 30, of transverse dimensions substantially identical to the transverse dimensions presented by the mouth of a single pocket 5, and disposed facing directly toward the mouth of the pocket 5 currently in alignment with the station 30. A forward portion of each recess 35 is occupied by a bar 36 extending parallel to the axis 7 of the wheel 4 and forming part of a pressure element 37 associated with each heat-seal unit 29, whilst the rear portion of each recess 35 affords an opening 38 serving to admit the head 39 of a heat-seal element 40 associated with each heat-seal unit 29.

Figure 3:
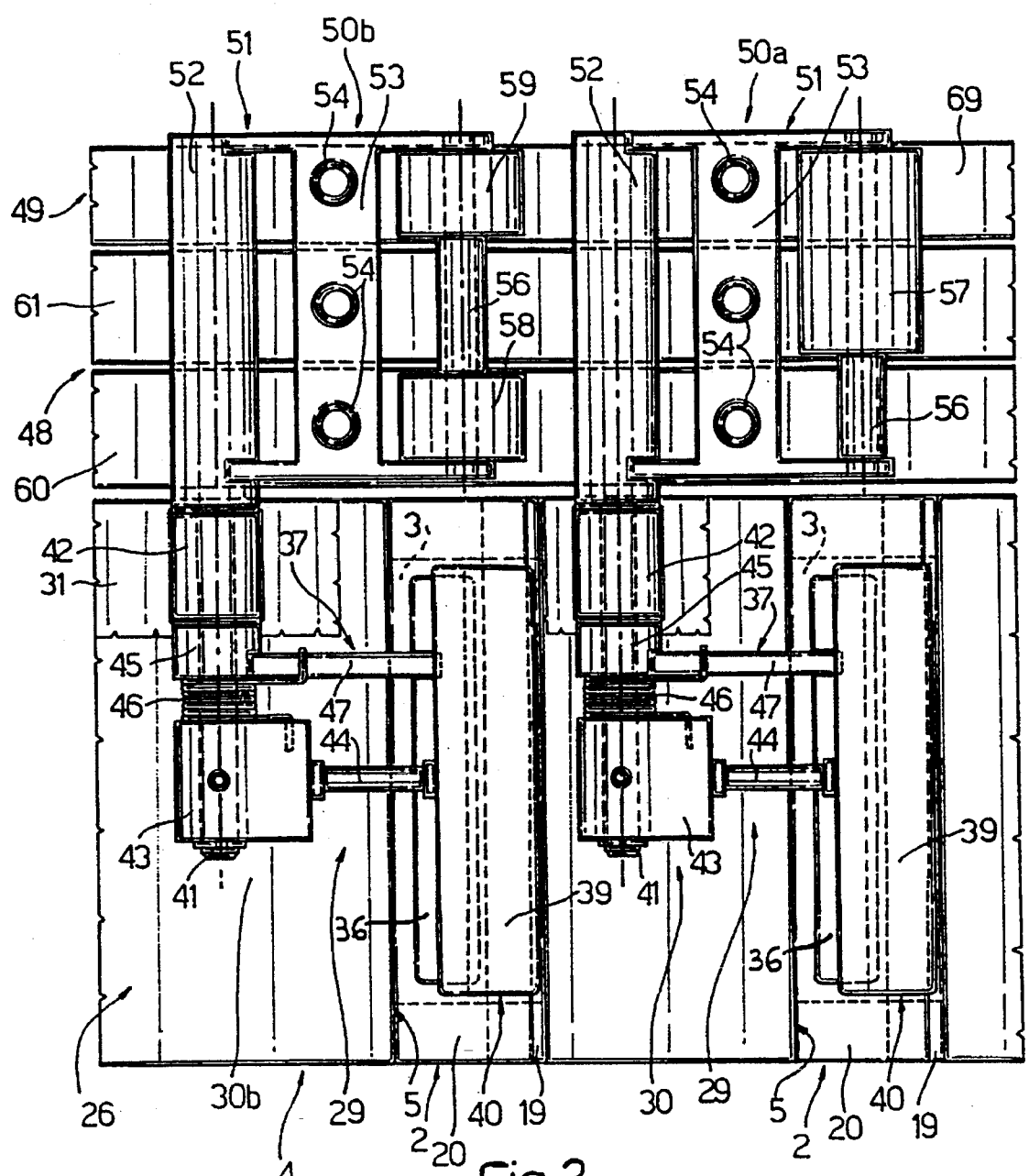
FIG. 3 shows a detailed plan view of the device of the present invention, enlarged and with certain parts omitted better to reveal others.

As discernible from FIG. 2, and in particular from FIG. 3, each heat-seal unit 29 comprises a shaft 41 disposed parallel to the axis 7 of the wheel 4, of which a central portion is supported rotatably by a sleeve 42 rigidly associated with an outer surface of the arched plate 31. A portion of the shaft 41 projecting externally of the sleeve 42 and across the peripheral surface 26 of the wheel 4 carries a hub 43 keyed to the projecting end and supporting the heat-seal element 40, which is carried in turn by an arm 44 connecting the head 39 and the hub 43. The shaft 41 also carries a freely supported second hub 45 positioned between the first hub 43 and the sleeve 42, coupled to the first hub 43 by way of a torsion spring 46 and forming a further part of the pressure element 37 aforementioned. Beside the bar 36, element 37 also comprises an arm 47 connecting the bar 36 and the hub 45. The spring 46 is tensioned in such a manner as to bias the pressure element 37 toward the surface 26 of the wheel 4 in opposition to the corresponding heat-seal element 40, and such that the two arms 44 and 47 compass a given angle, when at rest, of which the width can be reduced against the action of the spring 46.

Figure 4:
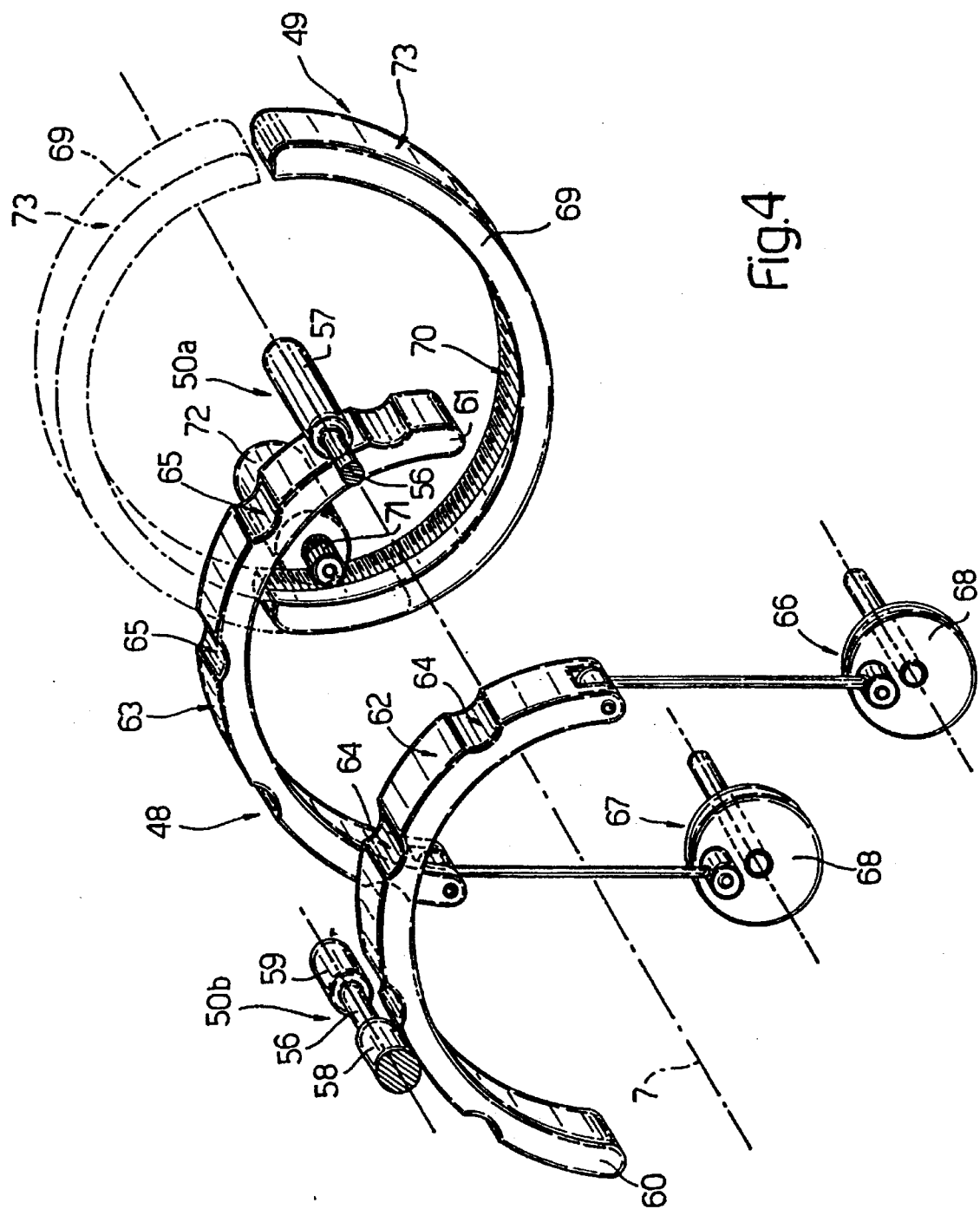
FIG. 4 illustrates certain details of FIG. 3 in an exploded view.

As illustrated best in FIGS. 3 and 4, each complete heat-seal unit 29 is equipped with an operating device 48 and a control device 49, both of which function in combination with a tappet element 50 relative to each heat-seal unit 29. More exactly, the tappet element is denoted 50*a* for the units 29 associated with the odd stations 30*a*, and denoted 50*b* for the units 29 associated with the even stations 30*b*.

In FIG. 3, each tappet element 50 will be seen to comprise a yoke 51, of which one cross member 52 consists in a portion of the corresponding shaft 41 projecting from the relative sleeve 42 on the side opposite from the heat-seal unit 29. The yoke 51 extends from the shaft 41 on the same side as the relative pressure and heat-seal elements 37 and 40, and incorporates an intermediate cross member 53 affording sockets 54 to receive the extremities of respective springs 55 compressed between the cross member 53 and the internal surface of the outermost arched plate 32. The construction enables the yoke 51 to pivot about the axis of the corresponding shaft 41 toward the axis 7 of the overwrapping wheel 4. The yoke 51 supports a further shaft 56 on the side of the intermediate cross member 53 opposite from the shaft 41 of the heat-seal unit, carrying a keyed tappet roller embodied. In the case of the tappet elements 50*a* associated with the odd stations 30*a*, a single roller 57 occupies a lateral portion and a central portion of the shaft 56, and in the case of the tappet elements 50b associated with the even stations 30*b*, a pair of rollers 58 and 59 occupy respective opposite lateral portions of the shaft 56.

As illustrated in FIG. 4, the operating device 48 comprises two cams 60 and 61 centered on the axis 7 of the wheel 4 and extending concurrently with the conveying path 9. Cam 60 is positioned under the lateral portion of the shafts 56 with the paired rollers 58, and cam 61 is positioned under the central portion of the shafts 56 and interacting with the single rollers 57. The two cams 60 and 61 exhibit relative cylindrical outer surfaces 62 and 63, and afford respective pluralities of seatings 64 and 65 distributed along the surfaces 62 and 63 at regular intervals identical to the pitch of the pockets 5, which are staggered one in relation to the other. The geometry of the two cams is such that when the seatings 65 and 64 are occupied by the respective rollers 57 and 58, the relative tappet elements 50*a* and 50*b* are able to rotate toward the axis 7 of the wheel 4 and the respective pressure and heat-seal elements 37 and 40 to effect a movement toward an operative position in contact with the periphery of the wheel 4, as will become clear in due course. The two cams 60 and 61 are invested with mutually opposed and identically timed rocking movements generated by respective rod-and-crank mechanisms 66 and 67, of which the cranks 68 are synchronized with the center shaft 6 so as to accomplish one full revolution for every two indexing steps of the wheel 4. Thus, each heat-seal unit 29 is caused to operate once with each alternate step indexed by the wheel 4. During each pause of the wheel, one of any two adjacent units 29 will be activated while the other remains at rest.

Naturally enough, the timing of the cams 60 and 61 will be such that with successive pauses of the wheel 4, the heat-seal units 29 activated are those currently in alignment with the pockets 5 of the wheel 4.

In the illustration of FIG. 4, the control device 49 is shown as comprising a semi-annulus 69 disposed coaxially with the axis 7 of the wheel 4, affording an internal tooth profile 70 engaged in mesh with the pinion 71 of a stepping motor 72 and capable of progressive and controlled movement about the axis 7 in either direction of rotation. The semi-annulus 69 exhibits a cylindrical outer surface 73 occupying a common plane with the two cam surfaces 62 and 63 and positioned to interact with the tappet elements 50*a* and 50*b*, engaging with the roller denoted 59 and a portion of the roller denoted 57, respectively. Activating the motor 72, the semi-annulus 69 can be made to rotate between an at-rest angular limit position, indicated by the continuous line in FIG. 4, in which the cylindrical outer surface 73 lies beyond the compass of the conveying path 9, and an operating limit position indicated by the phantom line of FIG. 4, in which the cylindrical outer surface 73 engages all of the corresponding tappet rollers 59 and 57 except for one roller 57 at the first heat-seal station 30a following the infeed station 10.

As discernible from FIG. 1, the outfeed station 11 essentially comprises a folding channel 74 equipped with helical folders 75 of conventional type and disposed in alignment with a pocket 5 of the wheel lying one indexing step beyond the final heat-seal station 30a. The outfeed station 11 also includes a pushing device 76 by which the single packets 3 are ejected in succession from the respective pockets 5, and a conventional conveyor belt 77 on which the packets 3 run out.

The operation of the device 1 will now be described departing from the situation of FIG. 1, in which the overwrapping wheel 4 has indexed one step to bring an empty pocket 5 into alignment with the infeed station 10, the feed wheel 13 has indexed one step to bring a pocket 14 with a respective packet 3 likewise into the station 10, and a sheet 15 of material has been directed into the station 10 and lies interposed between the two wheels 4 and 13. From this position, the packet 3 is ejected from the pocket 14 by activating the pushing device 16, and directed through the passage 18, impinging on the sheet 15 in the process. The sheet 15 is thus made to fold around the packet into a U formation, whereupon the packet 3 and the sheet 15 advance as one to the point of entering the relative pocket 5 of the overwrapping wheel 4 and coming to rest in the position indicated by phantom lines in FIG. 2. The moving folder 21, which lies initially in the at-rest position outside the compass of the infeed station 10 (see dash-dash phantom line in FIG. 2), is now rotated forward to the intermediate folding position (dot-dash phantom line in FIG. 2), cutting across the station 10 and thus flattening the rear longitudinal flap 19 against the exposed flank of the packet 3. In effect, the flap 19 is not covered completely by the plate 24 of the moving folder 21 in the intermediate position, but remains exposed along the extreme edge.

Immediately thereafter, the overwrapping wheel 4 indexes one step, bringing the pocket 5 in question to the first heat-seal station 30a, at which point there is no pocket 5 in alignment with the infeed station 10. The moving folder 21 rotates together with the wheel 4 and at the same velocity through the indexing step, advancing from the intermediate position to the operative limit position (bold line in FIG. 2), maintaining the same breadth of contact with the flap 19 and applying a static pressure (substantially in a radial direction with respect to the wheel 4) by which the corresponding portion of the sheet 15 is held flat against the packet 3. On obtaining the operative limit position, the moving folder 21 is disposed partly overlapping the angled face 34 of the fixed folder 33, which in turn will have begun to impinge gradually on the forwardmost flap 20 during the rotation of the wheel, with the result that this flap 20 is flattened against the angled external face 27 afforded by the plate 24 of the moving folder 21, as discernible in FIG. 2. At this juncture the cams 60 and 61 are shifted by the operating device 48, bringing one cylindrical surface 62 beneath the corresponding rollers 58 of all the "even" tappet elements 50b, and positioning each seating 65 of the other cylindrical surface 63 under the roller 57 of an "odd" tappet element 50a, of which the associated odd heat-seal stations 30a are the only stations currently in alignment with the pockets 5. In particular, the movement of the operating device 48 results in a seating 65 of the relative cam 61 being positioned beneath the tappet element 50a associated with the heat-seal unit 29 of the station 30a lying at one indexing step from the infeed station 10. The roller 57 is pressured by the spring 55 into the seating 65, causing the shaft 41 to pivot clockwise (as viewed in FIG. 2) about its own axis. In a first part of the rotation induced, a static force is applied substantially in the radial direction by the bar 36 of the pressure element 37, which faces both the outer surface of the forwardmost flap 20 and the portion of the rear flap 19 not covered by the plate 24 of the moving folder 21. This pins the one flap 20 against the other flap 19 along the flank surface of the packet 3 and thus restrains both flaps 19 and 20 in their correct overlapping position. At this point, the moving folder 21 returns to the at-rest position, but without disturbing the position of the respective flap 19 now held fast by the bar 36. The shaft 41, in the meantime continues to rotate against the action of the coupling spring 46, lowering the head 39 of the heat-seal element 40 to the point at which the two longitudinal flaps 19 and 20, still correctly overlapping, are fastened one to another. The formation of the tubular overwrapping 2 around the packet 3 is thus completed.

The wheel 4 indexes a further step, by which a new empty pocket 5 is brought into alignment with the infeed station 10. The packet 3 referred to thus far is advanced to the successive station 30b, of which the heat-seal unit 29 is activated by the operating device 48 in concert with the units 29 of all the remaining even stations 30b in such a way as to reinforce the joint between the two flaps 19 and 20 by applying additional heat-sealing action in the manner described previously. The number of discrete heat-seal strokes applied to the tubular overwrapping 2 thereafter along the path 9 to the outfeed station 11 is determined by the control device 49, and will in general be greater as the indexing frequency of the overwrapping wheel 4 is increased.

The advantages discernible from the foregoing are essentially twofold.

First, the use of a moving folder 21 which, once the relative flap 19 of the wrapping sheet has been flattened during a pause in the indexing movement of the wheel 4, accompanies the wheel through one step to the first heat-seal station 30 and then returns to the at-rest position only after the flaps 19 and 20 have been secured in position by the bar 36, so that the flap 19 remains correctly folded in any contingency.

Second, the fact that the single step indexed by the wheel 4 is half, or in any event a submultiple, of the angular distance separating the pockets 5 (which in its turn is a submultiple of the length of the path 9 interconnecting the stations 10 and 11) not only minimizes the distance covered by the moving folder 21, but also allows the installation of a relatively high number of heat-seal stations 30 along the conveying path 9 (substantially double the number of the pockets 5 occupying the path 9, and in any event variable by means of the control device 49. This also achieves an extremely precise measure of control over the total heat-seal time while maintaining the temperatures of the heat-seal heads 39 within acceptable limits.

What is claimed:

1. A device for forming heat-sealable tubular overwrappings around commodities, comprising:

an overwrapping wheel having a plurality of circumferentially spaced peripheral pockets each for containing a respective commodity, said wheel being mounted rotatably about its own axis in such a way as to move the commodities in a given feed direction along a conveying path between an infeed station and an outfeed station;

feed means for supplying the commodities singly and in succession each together with a respective overwrapping sheet to the infeed station;

pushing means for directing each commodity into a respective pocket in such a manner so as to cause the sheet to fold around the commodity into a "U" formation with a first and a second longitudinal flap thereof remaining projecting laterally from the commodity and externally of the pocket, the first flap following the second flap in the feed direction;

first folding means for folding the first longitudinal flap of each successive sheet against the respective commodity and capable of movement together with the respective commodity and said wheel between an at-rest position and a folding position while maintaining the first longitudinal flap folded against the respective commodity;

second folding means disposed at a position immediately beyond the folding position along the conveying path for folding the second flap of each successive sheet over the corresponding first flap;

a first heat-seal station positioned along the conveying path at a position beyond the folding position;

pressing means positioned at the first heat-seal station capable of movement toward the wheel in such a way as to restrain the second flap over the first flap; and first heat-sealing means positioned at the first heat-seal station for securing the restrained second flap to the first flap in such a way as to form a tubular overwrapping;

said first folding means continuing movement together with the wheel to maintain the first longitudinal flap folded against the respective commodity as it moves from the folding position to the first heat-seal station.

2. A device as in claim 1 wherein the folding position coincides with the infeed station.

3. A device as in claim 1, wherein the commodities are intermittently indexed along the conveying path through a plurality of indexing steps of equal length in said feed direction, and wherein the length of each indexing step is a submultiple of a circumferential distance between the peripheral pockets.

4. A device as in claim 2, wherein the length of each indexing step is a submultiple of a circumferential distance between the peripheral pockets.

5. A device as in claim 3, wherein the length of the conveying path is a multiple of the length of each indexing step and at least integrally divisible by the circumferential distance between pockets.

6. A device as in claim 4, wherein the length of the conveying path is a multiple of the length of each indexing step and at least integrally divisible by the circumferential distance between pockets.

7. A device as in claim 5, wherein the length of each indexing step is equal to half the circumferential distance between pockets.

8. A device as in claim 6, wherein the length of each indexing step is equal to half the circumferential distance between pockets.

9. A device as in claim 5, additionally comprising a plurality of further heat-sealing means distributed along the conveying path, separated one from the next by a length equal to the length of each indexing step, and operating means serving to activate any of the further heat-sealing means disposed in alignment with a peripheral pocket following each indexing step.

10. A device as in claim 6, additionally comprising a plurality of further heat-sealing means distributed along the conveying path, separated one from the next by a length equal to the length of each indexing step, and operating means serving to activate any of the further heat-sealing means disposed in alignment with a peripheral pocket following each indexing step.

11. A device as in claim 7, additionally comprising a plurality of further heat-sealing means distributed along the conveying path, separated one from the next by a length equal to the length of each indexing step, and operating means serving to activate any of the further heat-sealing means disposed in alignment with a peripheral pocket following each indexing step.

12. A device as in claim 8, additionally comprising a plurality of further heat-sealing means distributed along the conveying path, separated one from the next by a length equal to the length of each indexing step, and operating means serving to activate any of the further heat-sealing means disposed in alignment with a peripheral pocket following each indexing step.

13. A device as in claim 9, further comprising control means designed to interact with the operating means so as to inhibit the activation of a selectable number of the further heat-sealing means.

14. A device as in claim 10, further comprising control means designed to interact with the operating means so as to inhibit the activation of a selectable number of the further heat-sealing means.

15. A device as in claim 11, further comprising control means designed to interact with the operating means so as to inhibit the activation of a selectable number of the further heat-sealing means.

16. A device as in claim 12, further comprising control means designed to interact with the operating means so as to inhibit the activation of a selectable number of the further heat-sealing means.

* * * * *